United States Patent
Liu

(10) Patent No.: US 9,843,575 B2
(45) Date of Patent: Dec. 12, 2017

(54) WIRELESS NETWORK AUTHENTICATION METHOD AND WIRELESS NETWORK AUTHENTICATION APPARATUS

(71) Applicant: BEIJING ZHIGU RUI TUO TECH CO., LTD., Beijing (CN)

(72) Inventor: Jia Liu, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 0 days.

(21) Appl. No.: 14/787,250

(22) PCT Filed: Jan. 23, 2014

(86) PCT No.: PCT/CN2014/071183
§ 371 (c)(1),
(2) Date: Oct. 26, 2015

(87) PCT Pub. No.: WO2015/043131
PCT Pub. Date: Apr. 2, 2015

(65) Prior Publication Data
US 2016/0119316 A1    Apr. 28, 2016

(30) Foreign Application Priority Data

Sep. 30, 2013 (CN) ........................... 2013 1 0462287

(51) Int. Cl.
*H04L 29/06* (2006.01)
*H04W 12/06* (2009.01)
*H04W 12/04* (2009.01)

(52) U.S. Cl.
CPC .......... *H04L 63/083* (2013.01); *H04L 63/061* (2013.01); *H04L 63/20* (2013.01); *H04W 12/04* (2013.01); *H04W 12/06* (2013.01)

(58) Field of Classification Search
USPC ....................................................... 713/171
See application file for complete search history.

(56) References Cited

U.S. PATENT DOCUMENTS

2009/0122782 A1 * 5/2009 Horn ................... H04W 56/001
                                                          370/350
2009/0129341 A1 * 5/2009 Balasubramanian ......................
                                                          H04W 36/0055
                                                          370/331

(Continued)

FOREIGN PATENT DOCUMENTS

CN    101656955 A    2/2010
CN    102377756 A    3/2012

(Continued)

OTHER PUBLICATIONS

PCT International Search Report dated Jul. 7, 2014, issued in corresponding International Application No. PCT/CN2014/071183 (5 pages).

(Continued)

*Primary Examiner* — Jason Lee

(57) ABSTRACT

Embodiments of the present application provide a wireless network authentication method and wireless network authentication apparatuses, and relate to the field of network security technologies. The method comprises: generating a to-be-verified address according to history access information related to a target access point (AP), wherein the to-be-verified address is used to identify an identity of a client device; and sending an authentication request comprising the to-be-verified address to the target AP. By using the method and the apparatuses in the embodiments of the present application, a client device generates a to-be-verified address by using history access information, and an AP identifies and verifies a real identity of a corresponding client device according to the history access information, so as to provide a network service for a history access device, such that a history access client device can also obtain fast network access in the case of not knowing an access password.

47 Claims, 6 Drawing Sheets

(56) References Cited

U.S. PATENT DOCUMENTS

| | | | |
|---|---|---|---|
| 2010/0049984 A1 | 2/2010 | Masushio et al. | |
| 2011/0273309 A1* | 11/2011 | Zhang | H04M 1/72536 340/870.07 |
| 2011/0302408 A1* | 12/2011 | McDermott | H04L 63/0464 713/153 |
| 2013/0040603 A1* | 2/2013 | Stahlberg | H04L 63/126 455/410 |

FOREIGN PATENT DOCUMENTS

| | | |
|---|---|---|
| CN | 102547703 A | 7/2012 |
| CN | 102572799 A | 7/2012 |
| EP | 2051473 A1 | 4/2009 |
| WO | WO 2013/054121 A1 | 4/2013 |

OTHER PUBLICATIONS

Translation of Office Action for CN App. No. 201310462287.5, dated Feb. 3, 2016, 3 pages.

Chinese Patent Application No. 201310462287.5, Office Action dated Feb. 3, 2016.

\* cited by examiner

WIRELESS NETWORK AUTHENTICATION METHOD AND WIRELESS NETWORK AUTHENTICATION APPARATUS

CROSS-REFERENCE TO RELATED APPLICATIONS

The present application is a national stage application of International Application No. PCT/CN2014/071183, filed on Jan. 23, 2014, which claims priority to and the benefit of Chinese Patent Application No. 201310462287.5 filed with the State Intellectual Property Office of P.R. China on Sep. 30, 2013, and entitled "WIRELESS NETWORK AUTHENTICATION METHOD, AND CLIENT AND SERVER-WIRELESS NETWORK AUTHENTICATION APPARATUS ". The contents of both of the above-referenced applications are herein incorporated by reference in their entirety.

TECHNICAL FIELD

The present application relates to the field of wireless local area network (WLAN) technologies, and in particular, to a wireless network authentication method and wireless network authentication apparatus.

BACKGROUND

WLANs aim to provide a network access service for wireless users, and to meet a demand of users for accessing network resources (for example, the Internet). Currently, many public places (for example, a shopping mall, a coffee shop, an airport, a conference center, and a library) are deployed with WLANs, and after accessing the WLANs, users can access a basic local service, or implement faster or cheaper Internet access. There is one type of application demand in the foregoing scenario, that is, a network service provider needs to quickly identify a user identity to provide a better service. For example, automatic network access is provided for a user who has visited the place before, or a larger network bandwidth is provided for a guest who frequently visits the place.

Currently, most wireless management software on a client device can set a WLAN access point (AP) configuration file and save an AP service set identifier (SSID) and corresponding access password to ensure direct access next time; however, the problem of such a method lies in that a user has to enter a password again and update the configuration file once the password is changed; as a result, fast network access cannot be implemented; and another problem lies in that an AP cannot verify a real identity of a mobile device, in other words, any mobile device having the access password can modify a media access control (MAC) address of the mobile device and be in disguise as another user (for example, a user with a high service level), so as to gain benefits.

SUMMARY

An objective of the present application is to provide a wireless network authentication method and wireless network authentication apparatuses, which can identify and verify a real identity of a device and implement fast network access.

To solve the foregoing technical problems, in a first aspect, an embodiment of the present application provides a wireless network authentication method, wherein the method comprises:

generating a to-be-verified address according to history access information related to a target AP, wherein the to-be-verified address is used to identify an identity of a client device; and sending an authentication request comprising the to-be-verified address to the target AP.

In a second aspect, an embodiment of the present application provides a wireless network authentication method, wherein the method comprises:

receiving an authentication request sent by at least one client device; and authenticating, according to history access information, a client device corresponding to an authentication request comprising a to-be-verified address;

wherein the to-be-verified address is generated by the at least one client device according to history access information related to an AP, and the to-be-verified address is used to identify an identity of the client device.

In a third aspect, an embodiment of the present application provides a client wireless network authentication apparatus, wherein the apparatus comprises:

an address generating module, configured to generate a to-be-verified address according to history access information related to a target AP, wherein the to-be-verified address is used to identify an identity of a client device; and a sending module, configured to send an authentication request comprising the to-be-verified address to the target AP.

In a fourth aspect, an embodiment of the present application provides a server wireless network authentication apparatus, wherein the apparatus comprises:

a receiving module, configured to receive authentication request sent by at least one client device; and an authenticating module, configured to authenticate, according to history access information, a client device corresponding to an authentication request comprising a to-be-verified address;

wherein the to-be-verified address is generated by the at least one client device according to history access information related to an AP, and the to-be-verified address is used to identify an identity of the client device.

By using the method and the apparatuses in the embodiments of the present application, a client device generates a to-be-verified address by using history access information, and an AP identifies and verifies a real identity of a corresponding client device according to the history access information, so as to provide a network service for a history access device, such that a history access client device can also obtain fast network access in the case of not knowing an access password. In addition, a time stamp is used in a process of creating the to-be-verified address, and the time stamp is updated when access is performed each time, so as to avoid a replay attack. Moreover, by using the to-be-verified address, the client device uses different addresses when accessing a network each time, thereby hiding the identity of the client device and avoiding disguise.

DETAILED DESCRIPTION

Figure 1:
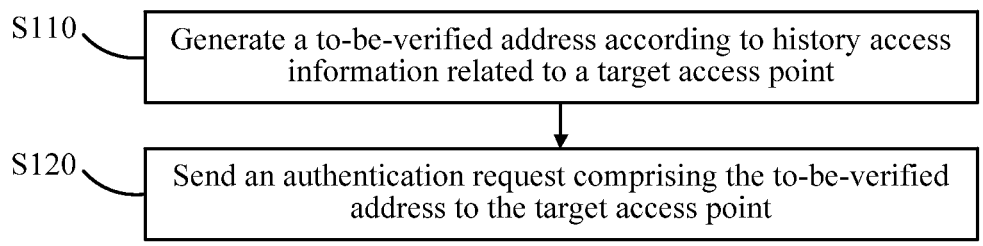
FIG. 1 is a flowchart of a wireless network authentication method implemented at a client according to an embodiment of the present application.

Specific implementations of the present application are further described in detail below with reference to the accompanying drawings and embodiments. The embodiments below are used to describe the present application, but are not intended to limit the scope of the present application.

WLAN networking may be simply divided into two parts: a WLAN client and a WLAN server. A client is a host device with a wireless network interface card, and a server is an AP device. To better understand the embodiments of the present application, a negotiation process of accessing a WLAN by a client device is briefly introduced below, and the process is as follows:

1. WLAN Service Discovery

An AP device sends beacon information to advertise a provided WLAN, and the client device determines a WLAN nearby according to the packet. The client device may specify an SSID or use a broadcast SSID to actively detect whether there is a specified network, and the AP device sends acknowledgement information to the client device if there is specified WLAN service.

After service discovery succeeds, a link authentication process is entered.

2. Link Authentication

This is a starting point for the client device to access a WLAN, and is one method to indicate an identity to the WLAN. Link authentication is implemented by using an authentication packet. Generally, if the WLAN enables access authentication, after link authentication succeeds by using an access password, only limited network access is allowed, and only after a user identity is determined in an access authentication process, higher level or more complete network access is allowed.

3. Terminal Association

In the process of WLAN service discovery, the client device has already obtained a configuration and a parameter (the AP device carries, for example, an access authentication algorithm and an encryption key, in Beacon and Probe Response packets) of a current service. After the client device succeeds in the link authentication, the client device initiates an association request or a re-association request, wherein the request carries various parameters of the client device and various parameters selected according to the service configuration (mainly including a supported rate, a supported channel, a supported QoS capability, and selected access authentication and encryption algorithms).

The client device and the AP device successfully complete link service negotiation, which indicates that the two devices successfully establish a link. To a WLAN service not enabling access authentication, the client device has already gained access to the WLAN, and to a WLAN service enabling access authentication, the AP device will initiate access authentication for the client.

4. Access Authentication

Access authentication implements identity authentication on a client device access, to provide security protection for a network service. During the link negotiation, an access authentication algorithm used by the client device can be determined. After the link negotiation succeeds, access authentication on the client device is triggered, then a key needs to be negotiated for the client device access, and then the client device can access the WLAN.

5. Key Negotiation

Key negotiation provides powerful guarantee for data security, and a negotiated key is used as an encryption/decryption key in a data transmission process.

6. Data Encryption

After the identity of the client device is determined correctly and an access right is granted, a network must prevent data transmitted by the client device from being intercepted. Protection of the privacy of wireless link data is a challenge that all wireless networks need to address. Data privacy is generally achieved by using an encrypted protocol, and only an authorized user with a key is allowed to access data to ensure that data is not tampered during transmission.

Authentication involved in the embodiments of the present application includes the foregoing processes after the link authentication, and the mentioned password is an access password of a wireless network service corresponding to an AP.

As shown in FIG. 1, an embodiment of the present application provides a wireless network authentication method implemented at a client. The method comprises:

S110: Generate a to-be-verified address according to history access information related to a target AP, wherein the to-be-verified address is used to identify an identity of a client device.

After starting a network access process, the client device scans AP information nearby (for example, SSID information), determines whether a history access record related to an AP corresponding to the AP information exists, and obtains the related history access information according to the AP information; if the related history access information does not exist, a standard access negotiation process mentioned above is entered, and a wireless network corresponding to the target AP is accessed by using an access password; and if the related history access information exists, the to-be-verified address may be generated according to the history access information, and fast network access may be sought by using the to-be-verified address.

In the embodiments of the present application, for the client device, the history access information may comprise one or more of a formerly used password of the target AP, the number of times that the wireless network corresponding to the target AP is accessed, and a time stamp (for example, a time when authentication by the target AP once succeeded). To query an access record, history information of each time of access should be saved, and a specific saving manner may be in the form of configuration file, a database, or the like.

S120: Send an authentication request comprising the to-be-verified address generated in Step S110 to the target AP.

Figure 2:
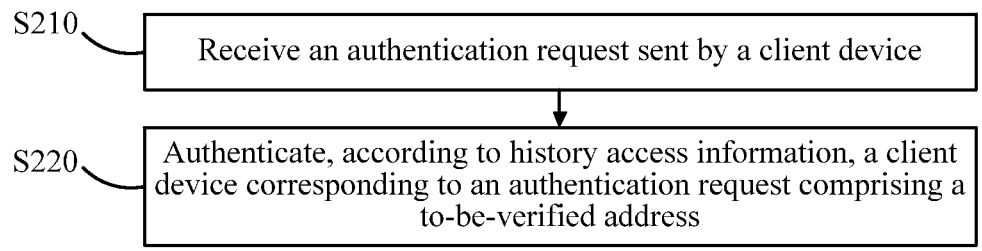
FIG. 2 is a flowchart of another wireless network authentication method implemented at a client according to an embodiment of the present application.

As shown in FIG. 2, an embodiment of the present application further provides a wireless network authentication method implemented at a server. Corresponding to the method implemented at a client shown in FIG. 1, the method in the embodiment shown in FIG. 2 comprises:

S210: Receive authentication request sent by at least one client device.

After starting an access process, an AP scans and receives an authentication request sent by a client device. If the authentication request does not comprise a to-be-verified address, a standard network service access process mentioned above is entered; otherwise, Step S220 is performed.

S220: Authenticate, according to history access information, a client device corresponding to the authentication request comprising the to-be-verified address.

The to-be-verified address is generated by the at least one client device according to history access information related to the AP, and the to-be-verified address is used to identify an identity of the client device.

For the server, the history access information may comprise one or more of a formerly used password of the AP, the number of times that the client device accesses a wireless network corresponding to the AP, a time stamp (for example, a time when the client device once succeeded in authentication of the AP), and a history network service policy for the client device. To query the history access information, the AP saves an access history of each client device. Specifically, the access history may be saved in a log file, a database, or in another form.

In the method in the embodiment of the present application, a client device generates a to-be-verified address by using history access information, and an AP identifies and verifies a real identity of a corresponding client device according to the history access information, so as to provide a network service for a history access device, such that a history access client device can also obtain fast network access in the case of not knowing an access password.

In the embodiments of the present application, the client device may save the history access information locally or in an external device, and can obtain history access information of the client device for each AP locally or from the external. Correspondingly, in the method in the embodiment shown in FIG. 1, a step of obtaining the history access information related to the target AP may be further included. The AP may also save history access information of each history access device locally or in an external device. When a data amount is large, the external device may be a cloud server.

In addition, in the method in the embodiment shown in FIG. 1, Step S110 may further comprise:

S111: Create an encryption key according to the history access information.

The encryption key may be obtained by performing an operation on all or a part of the history access information, for example, performing a simple addition operation on the formerly used password of the target AP and the time when the authentication by the target AP once succeeded.

S112: Generate the to-be-verified address according to the encryption key and a preset encryption algorithm.

In the method in the embodiment shown in FIG. 1, the preset encryption algorithm may be any encryption algorithm; however, to improve the security, a message digest algorithm (for example, MD5) is preferably selected. After the encryption key is generated, all or a part of the history access information and objects such as a random number may be encrypted by using the encryption key, so as to generate the to-be-verified address. In one implementation embodiment, Step S110 may further comprise:

S111': Create an encryption key according to the history access information: perform an addition operation according to the formerly used password of the target AP and the time when the authentication by the target AP once succeeded in the history access information, to obtain the encryption key.

S112': Generate, according to a preset encryption algorithm, the to-be-verified address by encrypting a random number by using the encryption key: encrypt, according to an MD5 algorithm, a group of random numbers (may be generated locally or in an external device) by using the encryption key created in Step S111', to generate the to-be-verified address comprising a random number and a verification part, wherein the verification part is obtained by encrypting the random number by using the encryption key.

In Step S120, the sent authentication request comprises a field of the to-be-verified address, and any length of the field of the to-be-verified address may be cut off according to a length requirement of the field to constitute the authentication request. It should be noted that, to ensure that the AP can match the history access information with the to-be-verified address with higher match efficiency, the time when the client device once succeeded in the authentication by the target AP may be further incorporated into the to-be-verified address.

In the methods in the embodiments of the present application, a time stamp may be used in a process of creating the to-be-verified address. The time stamp is a type of confidential information between the client device and the AP and must be updated when access is performed each time, so as to avoid a replay attack. By using the to-be-verified address, the client device uses different address when accessing a network each time, thereby hiding the identity of the client device and avoiding disguise.

Corresponding to the foregoing process implemented by the client device, in a possible implementation manner, Step S220 in the method implemented at the server shown in FIG. 2 may further comprise:

S221: Decrypt the to-be-verified address according to a preset decryption algorithm.

The preset decryption algorithm may be set according to negotiation between the client device and the AP, or for a same AP, the preset decryption algorithm does not need to be negotiated with any client device, and each client device already knows an encryption policy of an AP.

S222: Match the history access information with a decryption result.

In other words, the history access information is matched with history access information obtained through the decryption. In the method in the embodiment shown in FIG. 2, to improve the matching efficiency, the history access information and the decryption result may be first preprocessed, and then results of the preprocessing are matched.

S223: Determine that a client device corresponding to a decryption result having matched history information succeeds in the authentication.

In another possible implementation manner, Step S220 in the method implemented at the server shown in FIG. 2 may further comprise:

matching the history access information with the to-be-verified address, and when history access information matching the to-be-verified address exists, determining that a client device corresponding to the to-be-verified address succeeds in the authentication.

Corresponding to Step S111' to Step S113', the matching the history access information with the to-be-verified address comprises:

S221': Parse the authentication request comprising the to-be-verified address to obtain a random number and a verification address. When the to-be-verified address comprises the time when the client device once succeeded in the authentication by the AP, a parsing result further comprises the time.

S222': Encrypt, according to a preset encryption algorithm, the random number by using the history access information, to obtain a random address. The preset encryption algorithm is the same as an algorithm used by the client device to encrypt the random number, and for example, is also the MD5.

S223': Match the random address with the verification address.

In the method in the embodiment shown in FIG. 2, the history access information obtained by the AP may record a time period corresponding to a password formerly used by the AP. If the parsing result in Step S221' comprises the time when the client device once succeeded in the authentication of the AP, some pieces of the history access information may be first filtered out according to the time, and a random address corresponding to a time period into which the time falls is matched, so as to improve the matching efficiency.

S224': When a random address matching the verification address exists, determine that a client device corresponding to the verification address succeeds in the authentication.

Figure 3:
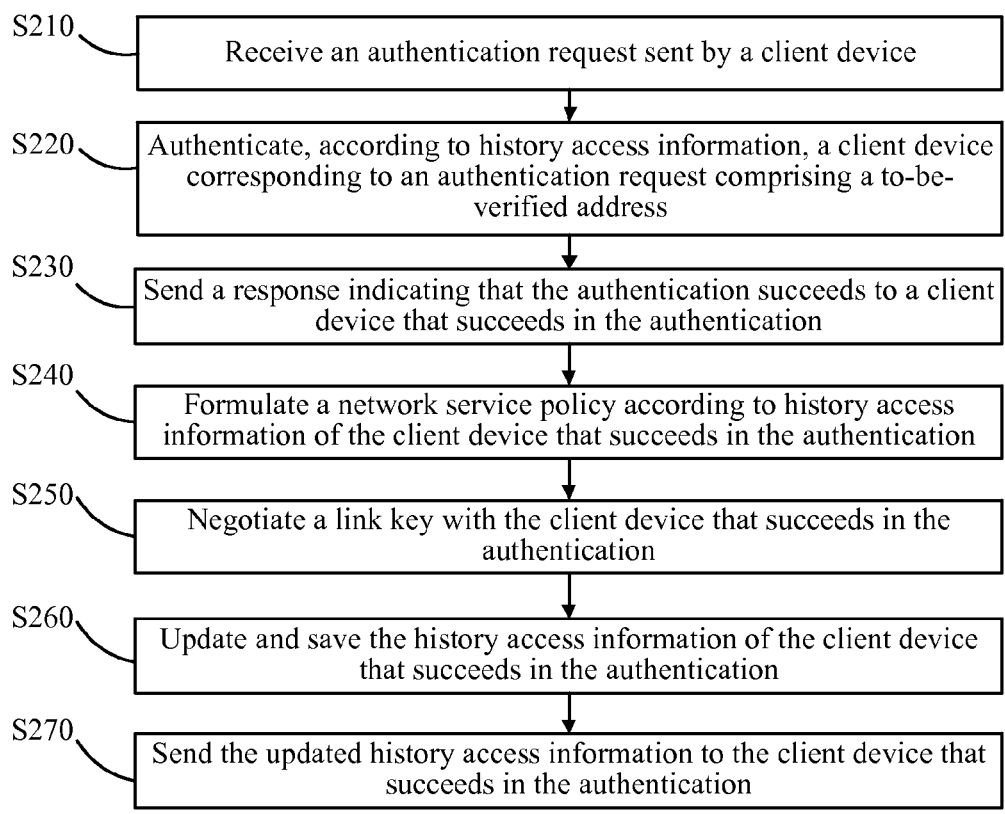
FIG. 3 is a flowchart of a wireless network authentication method implemented at a server according to an embodiment of the present application.

In the method in the embodiment shown in FIG. 3, after it is determined that the client device succeeds in the authentication, the method further comprises:

S230: Send a response indicating that the authentication succeeds to a client device that succeeds in the authentication, so as to notify the client device that the client device has already succeeded in the authentication and can enjoy a higher level network service or all network services provided by a corresponding wireless network.

Because different network services can be provided for different client devices, for example, for a public place such as a coffee shop, the coffee shop may provide a network service, for example, provide a larger bandwidth and a higher priority, which is different from that of a customer that seldom visits the place, for a customer that visits the place frequently. Therefore, as shown in FIG. 3, the method in the embodiment shown in FIG. 2 further comprises:

S240: Formulate a network service policy according to history access information of the client device that succeeds in the authentication, wherein the history access information may comprise information such as the number of times that the client device accesses a corresponding wireless network and a history network service policy.

After the real identity of the client device is identified and verified, the method in the embodiment shown in FIG. 2 further comprises:

S250: Negotiate a link key with the client device that succeeds in the authentication.

Figure 4:
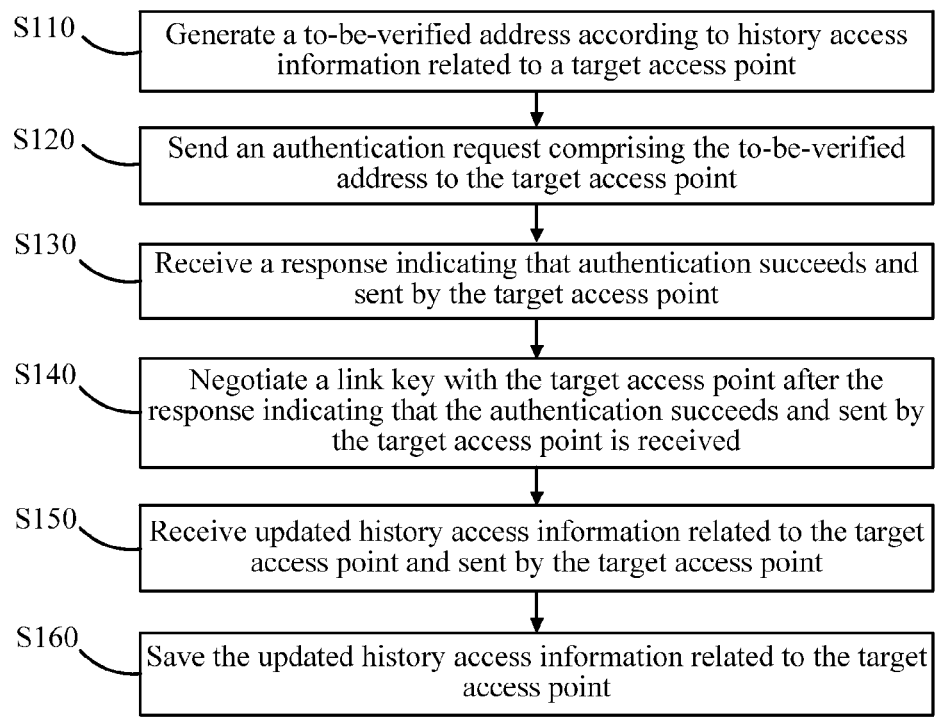
FIG. 4 is a flowchart of another wireless network authentication method implemented at a server according to an embodiment of the present application.

Correspondingly, as shown in FIG. 4, the method in the embodiment shown in FIG. 1 further comprises:

S130: Receive a response indicating that authentication succeeds and sent by the target AP.

S140: Negotiate a link key with the target AP after the response indicating that the authentication succeeds and sent by the target AP is received.

After the client device and the AP negotiate the link key to ensure the security of a communications link between the client device and the AP, the method in the embodiment shown in FIG. 2 further comprises:

S260: Update and save the history access information of the client device that succeeds in the authentication.

S270: Send, by using a negotiated encryption policy, the updated history access information to the client device that succeeds in the authentication.

Correspondingly, the method in the embodiment shown in FIG. 1 further comprises:

S150: Receive updated history access information related to the target AP and sent by the target AP.

S160: Save the updated history access information related to the target AP.

In conclusion, in the method in the embodiment of the present application, a client device generates a to-be-verified address by using history access information, and an AP identifies and verifies a real identity of a corresponding client device according to the history access information, so as to provide a network service for a history access device, such that a history access client device can also obtain fast network access in the case of not knowing an access password. In addition, a time stamp is used in a process of creating the to-be-verified address, and the time stamp is updated when access is performed each time, so as to avoid a replay attack. Moreover, by using the to-be-verified address, the client device uses different addresses when accessing a network each time, thereby hiding the identity of the client device and avoiding disguise.

It should be understood that in the embodiments of the present application, the sequence numbers of all the foregoing processes do not indicate an execution sequence, and the execution sequence of all processes should be determined by functions and internal logic of the processes, and shall not constitute any limitation to the implementation process of the embodiment of the present application.

Figure 5:
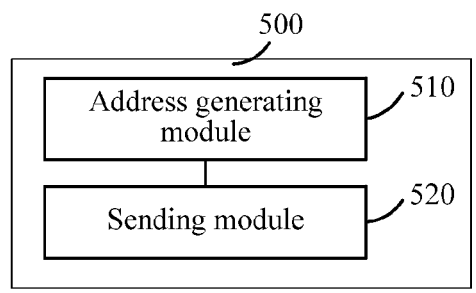
FIG. 5 is a structural block diagram of a client wireless network authentication apparatus according to an embodiment of the present application.

As shown in FIG. 5, an embodiment of the present application provides a client wireless network authentication apparatus 500. The apparatus 500 is located at a client, and may be any device (for example, a mobile phone, a tablet computer, a vehicle-mounted device, or a wearable device) with a wireless network interface card or a part of the device. The apparatus 500 comprises:

The address generating module 510 is configured to generate a to-be-verified address according to history access information related to a target AP, wherein the to-be-verified address is used to identify an identity of a client device, wherein after starting a network access process, the client device scans AP information nearby (for example, SSID information), determines whether a history access record related to an AP corresponding to the AP information nearby exists, and obtains the related history access information according to the AP information; if the related history access information does not exist, a standard access negotiation process mentioned above is entered, and a wireless network corresponding to the target AP is accessed by using an access password; and if the related history access information exists, the address generating module 510 may generate the to-be-verified address according to the history access information, and fast network access is sought by using the to-be-verified address; and the sending module 520 is configured to send an authentication request comprising the to-be-verified address to the target AP.

Figure 6:
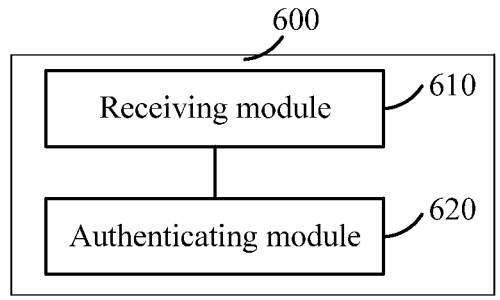
FIG. 6 is a structural block diagram of another client wireless network authentication apparatus according to an embodiment of the present application.

As shown in FIG. 6, an embodiment of the present application further provides a server wireless network authentication apparatus 600. The apparatus 600 is located at a server, and may be an AP device (for example, a wireless router, a gateway, or a network bridge) or belong to the AP device. As shown in FIG. 6, the apparatus 600 comprises:

a receiving module 610, configured to receive at least one authentication request sent by a client; and an authenticating module 620, configured to authenticate, according to history access information, a client device corresponding to an authentication request comprising a to-be-verified address.

The to-be-verified address is generated by the at least one client device according to history access information related to an AP, and the to-be-verified address is used to identify an identity of the client device.

After starting an access process, an AP scans and receives an authentication request sent by a client. If the authentication request does not comprise a to-be-verified address, a standard network service access process mentioned above is entered; otherwise, the authenticating module 620 identifies and verifies an identity of the client device according to the history access information.

By using the apparatus in the embodiment of the present application, a client device may generate a to-be-verified address according to history access information, and an AP may identify and verify a real identity of a corresponding client device according to the history access information, so as to provide a network service for a history access device, such that a history access client device can also obtain fast network access in the case of not knowing an access password.

In the embodiments of the present application, the client device may save the history access information locally or in an external device, and can obtain history access information of the client device for each AP locally or from the exterior. Correspondingly, the apparatus 500 in the embodiment shown in FIG. 5 further comprises an obtaining module 530, configured to obtain the history access information related to the target AP. The obtaining module 530 may obtain corresponding history access information according to an SSID of the AP. The AP may also save history access information of each history access device locally or in an external device. When a data amount is large, the external device may be a cloud server.

In addition, in the apparatus 500 in the embodiment shown in FIG. 5, the address generating module 510 may further comprise:

a key creating unit 511, configured to create an encryption key according to the history access information, wherein the encryption key may be obtained by performing an operation on all or a part of the history access information, for example, performing a simple addition operation on the formerly used password of the target AP and the time when the authentication by the target AP once succeeded; and an encrypting unit 512, configured to generate the to-be-verified address according to the encryption key and a preset encryption algorithm.

In the apparatus in the embodiment shown in FIG. 5, the preset encryption algorithm may be any encryption algorithm; however, to improve the security, a message digest algorithm (for example, MD5) is preferably selected. After the encryption key is generated, all or a part of the history access information and objects such as a random number may be encrypted by using the encryption key, so as to generate the to-be-verified address. In an implementation, the address generating module 510 may further comprise:

a key creating unit 511', configured to create an encryption key according to the history access information: perform an addition operation according to the formerly used password of the target AP and the time when the authentication by the target AP once succeeded in the history access information, to obtain the encryption key; and an encrypting unit 512', configured to generate, according to a preset encryption algorithm, the to-be-verified address by encrypting a random number by using the encryption key: encrypt, according to an MD5 algorithm, a group of random numbers (may be generated locally or in an external device) by using the encryption key created by the key creating unit 511', to generate the to-be-verified address comprising a random number and a verification part, wherein the verification part is obtained by encrypting the random number by using the encryption key.

The authentication request sent by the sending module 520 comprises a field of the to-be-verified address, and any length of the field of the to-be-verified address may be cut off according to a length requirement of the field to constitute the authentication request. It should be noted that, to ensure that the AP can match the history access information with the to-be-verified address with higher match efficiency, the time when the client device once succeeded in the authentication by the target AP may be further incorporated into the to-be-verified address.

In the apparatuses in the embodiments of the present application, a time stamp may be used in a process of creating the to-be-verified address. The time stamp is a type of confidential information between the client device and the AP and must be updated when access is performed each time, so as to avoid a replay attack. By using the to-be-verified address, the client device uses different address when accessing a network each time, thereby hiding the identity of the client device and avoiding disguise.

Corresponding to the configuration of the client wireless network authentication apparatus, in a possible implementation manner, the authenticating module 620 of the apparatus 600 shown in FIG. 6 may further comprise:

a decrypting unit 621, configured to decrypt the to-be-verified address according to a preset decryption algorithm, wherein the preset decryption algorithm may be set according to negotiation between the client device and the AP, or for a same AP, the preset decryption algorithm does not need to be negotiated with any client device and each client device already knows an encryption policy of an AP;

a matching unit 622, configured to match the history access information with a decryption result, in other words, match the history access information with history access information obtained through the decryption, wherein, in the apparatus 600 in the embodiment shown in FIG. 6, to improve the matching efficiency, the matching unit 622 may further comprise: a preprocessing subunit 6221, configured to preprocess the history access information and the decryption result, and a matching subunit 6222, configured to match results of the preprocessing by the preprocessing subunit; and an authenticating unit 623, configured to determine that a client device corresponding to a decryption result having matched history information succeeds in the authentication.

In another possible implementation manner, the authenticating module 620 of the apparatus 600 in the embodiment shown in FIG. 6 may further match the history access information with the to-be-verified address, and when a random address matching the verification address exists, determine that a client device corresponding to the to-beverified address succeeds in the authentication. Specifically, the authenticating module 620 may further comprise:

a parsing unit 621', configured to parse the authentication request comprising the to-be-verified address to obtain a random number and a verification address, wherein when the to-be-verified address comprises the time when the client device once succeeded in the authentication by the AP, a parsing result further comprises the time;

an encrypting unit 622', configured to encrypt, according to a preset encryption algorithm, the random number by using the history access information, to obtain a random address, wherein the preset encryption algorithm is the same as an algorithm used by the client device to encrypt the random number, and for example, is also the MD5;

a matching unit 623', configured to match the random address with the verification address, wherein in the apparatus 600 in the embodiment shown in FIG. 6, the obtained history access information may record a time period corresponding to a password formerly used by the AP, if the parsing result of the parsing unit 621' comprises the time when the client device once succeeded in the authentication by the AP, some pieces of the history access information may be first filtered out according to the time, and a random address corresponding to a time period into which the time falls is matched, so as to improve the matching efficiency; and an authenticating unit 624', configured to: when a random address matching the verification address exists, determine that a client device corresponding to the verification address succeeds in the authentication.

Figure 7:
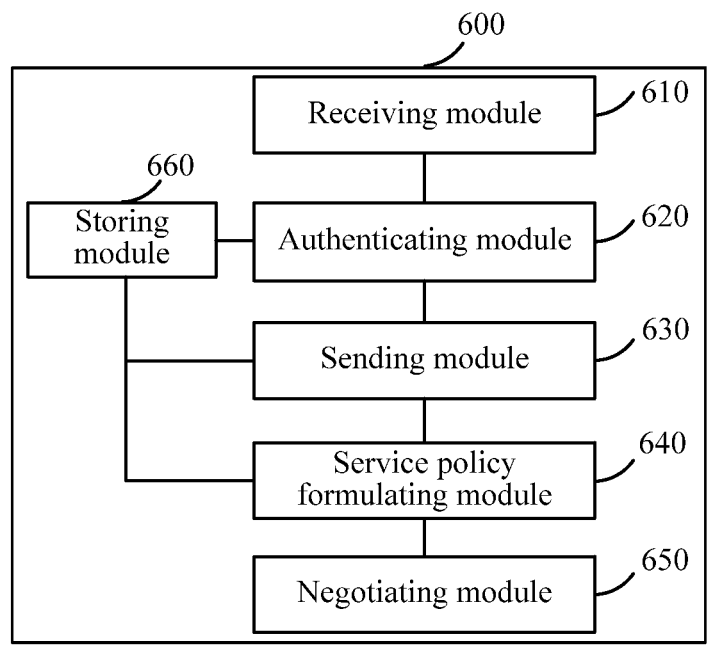
FIG. 7 is a structural block diagram of a server wireless network authentication apparatus according to an embodiment of the present application.

As shown in FIG. 7, the apparatus 600 in the embodiment shown in FIG. 6 further comprises:

a sending module 630, configured to send a response indicating that the authentication succeeds to a client device that succeeds in the authentication, so as to notify the corresponding client device that the client device has already succeeded in the authentication and can enjoy a higher level network service or all network services provided by a corresponding wireless network.

Because different network services can be provided for different client devices, for example, for a public place such as a coffee shop, the coffee shop may provide a network service, for example, provide a larger bandwidth and a higher priority, which is different from that of a customer that seldom visits the place, for a customer that visits the place frequently. Therefore, as shown in FIG. 7, the apparatus 600 in the embodiment shown in FIG. 6 further comprises:

a service policy formulating module 640, configured to formulate a network service policy according to history access information of the client device that succeeds in the authentication, wherein the history access information may comprise information such as the number of times that the client device accesses a corresponding wireless network and a history network service policy;

a negotiating module 650, configured to negotiate a link key with the client device that succeeds in the authentication; and a storing module 660, configured to update and save the history access information of the client device that succeeds in the authentication, wherein a specific saving manner may be configuring a file, a database, or the like.

The sending module 630 is further configured to: after the client device and the AP negotiate the link key to ensure the security of a communications link between the client device and the AP, send, by using a negotiated encryption policy, the corresponding updated history access information to the client device that succeeds in the authentication.

Figure 8:
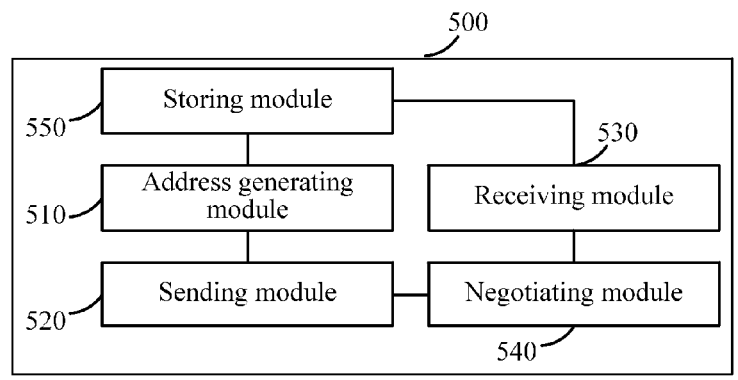
FIG. 8 is a structural block diagram of another server wireless network authentication apparatus according to an embodiment of the present application.

Correspondingly, as shown in FIG. 8, the apparatus 500 in the embodiment shown in FIG. 5 further comprises:

a receiving module 530, configured to receive a response indicating that authentication succeeds and sent by the target AP, and receive updated history access information related to the target AP and sent by the target AP;

a negotiating module 540, configured to negotiate a link key with the target AP after the receiving module 530 receives the response indicating that the authentication succeeds and sent by the target AP; and a storing module 550, configured to save the updated history access information related to the target AP, wherein a specific saving manner may be configuring a file, a database, or the like.

In conclusion, by using the apparatuses in the embodiments of the present application, a client device generates a to-be-verified address by using history access information, and an AP identifies and verifies a real identity of a corresponding client device according to the history access information, so as to provide a network service for a history access device, to cause that a history access client device can also obtain fast network access in the case of not knowing an access password. In addition, a time stamp is used in a process of creating the to-be-verified address, and the time stamp is updated when access is performed each time, so as to avoid a replay attack. Moreover, by using the to-be-verified address, the client device uses different addresses when accessing a network each time, thereby hiding the identity of the client device and avoiding disguise.

In addition, an embodiment of the present application further provides a computer readable medium (or medium), which comprises computer readable instructions that perform the following operations when being executed: executing operations from Step S110 to Step S160 in the methods in the embodiments shown in FIG. 1 and FIG. 4.

An embodiment of the present application further provides a computer readable medium (or medium), which comprises computer readable instructions that perform the following operations when being executed: executing operations from Step S210 to Step S270 in the methods in the embodiments shown in FIG. 2 and FIG. 3.

Figure 9:
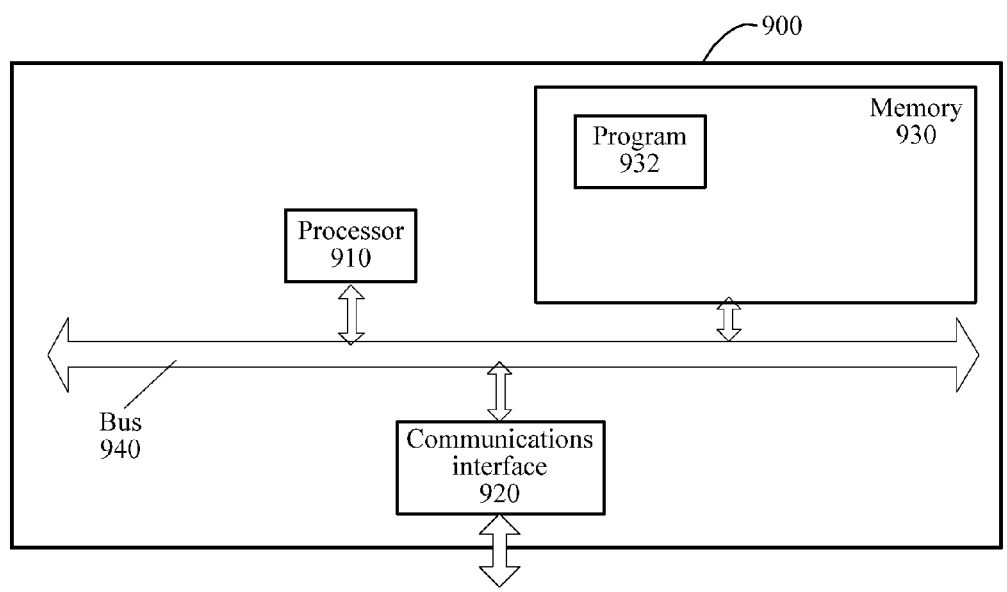
FIG. 9 is a structural block diagram of still another client wireless network authentication apparatus according to an embodiment of the present application.

FIG. 9 shows still another client wireless network authentication apparatus 900 according to an embodiment of the present application. Specific implementation of the wireless network authentication apparatus 900 is not limited by specific embodiments of the present application. As shown in FIG. 9, the apparatus may comprise:

a processor 910, a communications interface 920, a memory 930, and a communications bus 940, wherein:

the processor 910, the communications interface 920, and the memory 930 complete mutual communication by using the communications bus 940.

The communications interface 920 is configured to communicate with a network element, for example, a client.

The processor 910 is configured to execute a program 932, and may specifically execute related steps in the method embodiments shown in FIG. 1 and FIG. 4.

Specifically, the program 932 may comprise program code, wherein the program code comprises computer operation instructions.

The processor 910 may be a central processing unit (CPU), an application specific integrated circuit (ASIC), or is configured to one or more integrated circuits for implementing the embodiment of the present application.

The memory 930 is configured to store the program 932. The memory 930 may comprise a high-speed random access memory (RAM), and may also comprise a non-volatile memory, for example, at least one disk memory. The program 932 may specifically enable the apparatus 900 to execute the following steps:

generating a to-be-verified address according to history access information related to a target AP, wherein the to-be-verified address is used to identify an identity of a client device; and sending an authentication request comprising the to-be-verified address to the target AP.

For specific implementation of units in the program 932, reference may be made to corresponding steps or units in the embodiments of the present application, which is not described in detail herein again.

Figure 10:
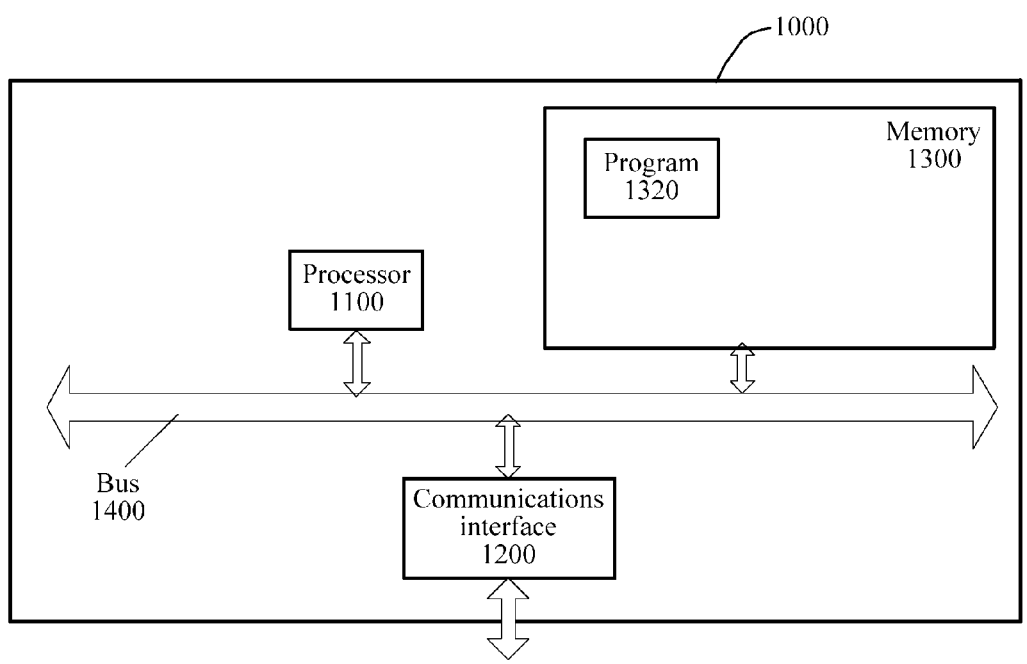
FIG. 10 is a structural block diagram of still another server wireless network authentication apparatus according to an embodiment of the present application.

FIG. 10 shows still another server wireless network authentication apparatus 1000 according to an embodiment of the present application. Specific implementation of the wireless network authentication apparatus 1000 is not limited by specific embodiments in the present application. As shown in FIG. 10, the apparatus 1000 may comprise:

a processor 1100, a communications interface 1200, a memory 1300, and a communications bus 1400, wherein:

the processor 1100, the communications interface 1200, and the memory 1300 complete mutual communication by using the communications bus 1400.

The communications interface 1200 is configured to communicate with a network element, for example, a client.

The processor 1100 is configured to execute a program 1320, and may specifically execute related steps in the method embodiment shown in FIG. 2 or FIG. 3.

Specifically, the program 1320 may comprise program code, wherein the program code comprises computer operation instructions.

The processor 1100 may be a CPU, an ASIC, or one or more integrated circuits configured to implement embodiments of the present application.

The memory 1300 is configured to store the program 1320. The memory 1300 may comprise a high-speed RAM, and may also comprise a non-volatile memory, for example, at least one disk memory. The program 1320 may specifically enable the apparatus 1000 to execute the following steps:

receiving an authentication request sent by at least one client device; and authenticating, according to history access information, a client device corresponding to an authentication request comprising a to-be-verified address;

wherein the to-be-verified address is generated by the at least one client device according to history access information related to an AP, and the to-be-verified address is used to identify an identity of the client device.

For specific implementation of units in the program 1320, reference may be made to corresponding steps or units in embodiments of the present application, which is not described in detail herein again.

A person of ordinary skill in the art may be aware that, the exemplary units and method steps described in the embodiments disclosed in this specification can be implemented by electronic hardware, or a combination of computer software and the electronic hardware. Whether the functions are performed in a hardware manner or a software manner depends on a particular application and a design constraining condition of the technical solutions. A person skilled in the art may use different methods to implement the described functions for each particular application, but it should not be considered that the implementation goes beyond the scope of the present application.

When the functions are implemented in a form of a software functional unit, and are sold or used as an independent product, the functions may be stored in a computer readable storage medium. Based on such an understanding, the technical solutions of the present application essentially, or the part contributing to the prior art, or a part of the technical solutions may be represented in a form of a software product. The computer software product is stored in a storage medium and comprises multiple instructions for instructing a computer module (which may be a personal computer, a server, a network module, or the like) to perform all or a part of the steps of the methods described in the embodiments of the present application. The foregoing storage medium comprises any medium that can store program code, such as a USB flash drive, a removable hard disk, a read-only memory (ROM), a RAM, a magnetic disk, or an optical disc.

The foregoing implementation manners are only used for describing the present application rather than limiting the present application. A person of ordinary skill in the art may make various changes and variations without departing from the spirit and scope of the present application; therefore, all equivalent technical solutions shall fall within the scope of the present application, and the patent protection scope of the present application shall be defined by the claims.

What is claimed is:

1. A wireless network authentication method, implementable by a client device, wherein the method comprises:

generating, at the client device, a to-be-verified address according to history access information related to a target access point (AP), wherein the to-be-verified address is used to identify an identity of the client device, and wherein the history access information related to the target AP is access information of the client device to the target AP; and sending an authentication request comprising the to-be-verified address to the target AP, causing the target AP to identify and verify the identity of the corresponding client device based on the history access information, to provide a network service for the client device which accessed to the target AP previously, such that the client device obtains network access via the target AP with the to-be-verified address instead of providing an access password.

2. The method according to claim 1, wherein the method further comprises:

obtaining the history access information related to the target AP.

3. The method according to claim 2, wherein the obtaining the history access information related to the target AP comprises:

obtaining the history access information according to identification information of an AP.

4. The method according to claim 1, wherein the generating a to-be-verified address according to history access information related to a target AP comprises:

creating an encryption key according to the history access information; and generating the to-be-verified address according to the encryption key and a preset encryption algorithm.

5. The method according to claim 1, wherein the generating a to-be-verified address according to history access information related to a target AP comprises:

creating an encryption key according to the history access information; and generating, according to a preset encryption algorithm, the to-be-verified address by encrypting a random number by using the encryption key.

6. The method according to claim 5, wherein the to-be-verified address comprises: the random number and a verification part, and the verification part is obtained by encrypting the random number by using the encryption key.

7. The method according to claim 6, wherein the to-be-verified address further comprises: a time when authentication by the target AP once succeeded.

8. The method according to claim 1, wherein the method further comprises:

receiving a response from the target AP indicating that authentication succeeds and sent by the target AP.

9. The method according to claim 8, wherein the method further comprises:

negotiating a link key with the target AP after the response indicating that the authentication succeeds is received.

10. The method according to claim 9, wherein the method further comprises:

receiving updated history access information related to the target AP and sent by the target AP.

11. The method according to claim 10, wherein the method further comprises:

saving the updated history access information related to the target AP.

12. The method according to claim 1, wherein the history access information comprises at least one of a formerly used password of the target AP, the number of times that a wireless network corresponding to the target AP is accessed, and a time stamp.

13. A wireless network authentication method, implementable by an access point (AP), wherein the method comprises:

receiving an authentication request sent by at least one client device; and authenticating, according to history access information, a client device corresponding to an authentication request comprising a to-be-verified address; wherein the to-be-verified address is generated by the at least one client device according to history access information related to the access point (AP), and the to-be-verified address is used to identify an identity of the client device, and wherein the history access information related to the access point is access information of the client device to the access point, causing the access point (AP) to identify and verify the identity of the corresponding client device based on the history access information, to provide a network service for the client device which accessed to the access point (AP) previously, such that the client device obtains network access via the access point (AP) with the to-be-verified address instead of providing an access password.

14. The method according to claim 13, wherein the authenticating, according to history access information, a client device corresponding to an authentication request comprising a to-be-verified address comprises:

decrypting the to-be-verified address according to a preset decryption algorithm;

matching the history access information with a decryption result; and determining that the client device succeeds in the authentication if the decryption result matches history access information.

15. The method according to claim 14, wherein the matching the history access information with a decryption result comprises:

preprocessing the history access information and the decryption result; and matching results of the preprocessing.

16. The method according to claim 13, wherein the authenticating, according to history access information, a client device corresponding to an authentication request comprising a to-be-verified address comprises:

matching the history access information with the to-be-verified address; and determining that the client device succeeds in the authentication if the to-be-verified address matches history access information.

17. The method according to claim 16, wherein the matching the history access information with the to-be-verified address comprises:

parsing the authentication request comprising the to-be-verified address to obtain a random number and a verification address;

encrypting, according to a preset encryption algorithm, the random number by using the history access information, to obtain a random address;

matching the random address with the verification address.

18. The method according to claim 16, wherein the preset encryption algorithm is the same as an encryption algorithm used to encrypt the random number.

19. The method according to claim 13, wherein the method further comprises:

sending a response indicating that the authentication succeeds to a client device that succeeds in the authentication.

20. The method according to claim 13, wherein the method further comprises:

formulating a network service policy according to history access information of a client device that succeeds in the authentication.

21. The method according to claim 13, wherein the method further comprises:

negotiating a link key with a client device that succeeds in the authentication.

22. The method according to claim 13, wherein the method further comprises:

updating and saving history access information of a client device that succeeds in the authentication.

23. The method according to claim 22, wherein the method further comprises:

sending the updated history access information to the client device that succeeds in the authentication.

24. The method according to claim 13, wherein the history access information comprises at least one of a formerly used password of the AP, the number of times that the client device accesses a wireless network corresponding to the AP, a time stamp, and a history network service policy for the client device.

25. A client wireless network authentication apparatus, implementable as a client device, wherein the apparatus comprises:

an address generating module, configured to generate a to-be-verified address according to history access information related to a target access point (AP), wherein the to-be-verified address is used to identify an identity of the client device, and wherein the history access information related to the target AP is access information of the client device to the target AP; and a sending module, configured to send an authentication request comprising the to-be-verified address to the target AP, causing the target AP to identify and verify the identity of the corresponding client device based on the history access information, to provide a network service for the client device which accessed to the target AP previously, such that the client device obtains network access via the target AP with the to-be-verified address instead of providing an access password.

26. The apparatus according to claim 25, wherein the apparatus further comprises:
an obtaining module, configured to obtain the history access information related to the target AP.

27. The apparatus according to claim 26, wherein the obtaining module is configured to obtain the history access information according to identification information of an AP.

28. The apparatus according to claim 25, wherein the address generating module comprises:
a key creating unit, configured to create an encryption key according to the history access information; and
an encrypting unit, configured to generate the to-be-verified address according to the encryption key and a preset encryption algorithm.

29. The apparatus according to claim 25, wherein the address generating module comprises:
a key creating unit, configured to create an encryption key according to the history access information; and
an encrypting unit, configured to generate, according to a preset encryption algorithm, the to-be-verified address by encrypting a random number by using the encryption key.

30. The apparatus according to claim 25, wherein the apparatus further comprises:
a receiving module, configured to receive a response from the target AP indicating that authentication succeeds.

31. The apparatus according to claim 30, wherein the apparatus further comprises:
a negotiating module, configured to negotiate a link key with the target AP after the response indicating that the authentication succeeds is received.

32. The apparatus according to claim 31, wherein the receiving module is further configured to receive updated history access information related to the target AP and sent by the target AP.

33. The apparatus according to claim 32, wherein the apparatus further comprises:
a storing module, configured to save the updated history access information related to the target AP.

34. A server wireless network authentication apparatus, implementable as an access point, wherein the apparatus comprises:
a receiving module, configured to receive an authentication request sent by at least one client device; and
an authenticating module, configured to authenticate, according to history access information, a client device corresponding to an authentication request comprising a to-be-verified address; wherein the to-be-verified address is generated according to history access information related to an access point (AP), and the to-be-verified address is used to identify an identity of the client device, and wherein the history access information related to the access point is access information of the client device to the access point, causing the access point (AP) to identify and verify the identity of the corresponding client device based on the history access information, to provide a network service for the client device which accessed to the access point (AP) previously, such that the client device obtains network access via the access point (AP) with the to-be-verified address instead of providing an access password.

35. The apparatus according to claim 34, wherein the authenticating module further comprises:
a decrypting unit, configured to decrypt the to-be-verified address according to a preset decryption algorithm;
a matching unit, configured to match the history access information with a decryption result of the decrypting unit; and
an authenticating unit, configured to determine that the client device succeeds in the authentication if the decryption result matches history access information.

36. The apparatus according to claim 35, wherein the matching unit further comprises:
a preprocessing subunit, configured to preprocess the history access information and the decryption result; and
a matching subunit, configured to match results of the preprocessing by the preprocessing subunit.

37. The apparatus according to claim 34, wherein the authenticating module is configured to match the history access information with the to-be-verified address, and determine that the client device succeeds in the authentication if the to-be-verified address matches history access information.

38. The apparatus according to claim 37, wherein the authenticating module further comprises:
a parsing unit, configured to parse the authentication request comprising the to-be-verified address to obtain a random number and a verification address;
an encrypting unit, configured to encrypt, according to a preset encryption algorithm, the random number by using the history access information, to obtain a random address;
a matching unit, configured to match the random address with the verification address; and
an authenticating unit, configured to determine that the client device succeeds in the authentication if the verification address has a matched random address.

39. The apparatus according to claim 34, wherein the apparatus further comprises:
a sending module, configured to send a response indicating that the authentication succeeds to a client device that succeeds in the authentication.

40. The apparatus according to claim 34, wherein the apparatus further comprises:
a service policy formulating module, configured to formulate a network service policy according to history access information of a client device that succeeds in the authentication.

41. The apparatus according to claim 34, wherein the apparatus further comprises:
a negotiating module, configured to negotiate a link key with a client device that succeeds in the authentication.

42. The apparatus according to claim 34, wherein the apparatus further comprises:
a storing module, configured to update and save history access information of a client device that succeeds in the authentication.

43. The apparatus according to claim 42, wherein the apparatus further comprises:
a sending module, configured to send the corresponding updated history access information to the client device that succeeds in the authentication.

44. A non-transitory computer readable storage medium, wherein the computer readable storage medium comprises executable instructions for:

generating a to-be-verified address according to history access information related to a target access point (AP), wherein the to-be-verified address is used to identify an identity of a client device, and wherein the history access information related to the target AP is access information of the client device to the target AP; and sending an authentication request comprising the to-be-verified address to the target AP, causing the target AP to identify and verify the identity of the corresponding client device based on the history access information, to provide a network service for the client device which accessed to the target AP previously, such that the client device obtains network access via the target AP with the to-be-verified address instead of providing an access password.

45. A non-transitory computer readable storage medium, wherein the computer readable storage medium comprises executable instructions for:

receiving an authentication request sent by at least one client device; and authenticating, according to history access information, a client device corresponding to an authentication request comprising a to-be-verified address; wherein the to-be-verified address is generated according to history access information related to an access point (AP), and the to-be-verified address is used to identify an identity of the client device, and wherein the history access information related to the access point is access information of the client device to the access point, causing the access point (AP) to identify and verify the identity of the corresponding client device based on the history access information, to provide a network service for the client device which accessed to the access point (AP) previously, such that the client device obtains network access via the access point (AP) with the to-be-verified address instead of providing an access password.

46. A client wireless network authentication apparatus, comprising a central processing unit (CPU) and a memory, wherein the memory stores computer-executable instructions, when executed by the CPU, configured to perform:

generating a to-be-verified address according to history access information related to a target access point (AP), wherein the to-be-verified address is used to identify an identity of a client device, and wherein the history access information related to the target AP is access information of the client device to the target AP; and sending an authentication request comprising the to-be-verified address to the target AP, causing the target AP to identify and verify the identity of the corresponding client device based on the history access information, to provide a network service for the client device which accessed to the target AP previously, such that the client device obtains network access via the target AP with the to-be-verified address instead of providing an access password.

47. A server wireless network authentication apparatus, comprising a central processing unit (CPU) and a memory, wherein the memory stores computer-executable instructions, when executed by the CPU, configured to perform:

receiving an authentication request sent by at least one client device; and authenticating, according to history access information, a client device corresponding to an authentication request comprising a to-be-verified address; wherein the to-be-verified address is generated according to history access information related to an access point (AP), and the to-be-verified address is used to identify an identity of the client device, and wherein the history access information related to the access point is access information of the client device to the access point, causing the access point (AP) to identify and verify the identity of the corresponding client device based on the history access information, to provide a network service for the client device which accessed to the access point (AP) previously, such that the client device obtains network access via the access point (AP) with the to-be-verified address instead of providing an access password.

\* \* \* \* \*